(12) United States Patent
Van Roermund et al.

(10) Patent No.: US 10,151,841 B2
(45) Date of Patent: Dec. 11, 2018

(54) ASSISTED GPS

(71) Applicant: NXP B.V.

(72) Inventors: Timotheus Van Roermund, Hamburg (DE); Cornelis Marinus Moerman, Eindhoven (NL)

(73) Assignee: NXP B.V., Eindhoven (NL)

(*) Notice: Subject to any disclaimer, the term of this patent is extended or adjusted under 35 U.S.C. 154(b) by 314 days.

(21) Appl. No.: 15/184,079

(22) Filed: Jun. 16, 2016

(65) Prior Publication Data

US 2016/0377725 A1 Dec. 29, 2016

(30) Foreign Application Priority Data

Jun. 26, 2015 (EP) .................................. 15173973.7

(51) Int. Cl.
*G01S 19/05* (2010.01)

(52) U.S. Cl.
CPC .................. *G01S 19/05* (2013.01)

(58) Field of Classification Search
CPC ........ G01S 19/05; G01S 19/258; G01S 19/06; G01S 19/07; G01S 19/256
USPC .................................................... 342/357.42
See application file for complete search history.

(56) References Cited

U.S. PATENT DOCUMENTS

| | | | |
|---|---|---|---|
| 6,813,561 B2 | 11/2004 | MacNeille et al. | |
| 8,350,755 B2 | 1/2013 | Abraham et al. | |
| 8,446,314 B2 | 5/2013 | Li | |
| 2009/0079622 A1 | 3/2009 | Seshadri et al. | |
| 2009/0231189 A1 | 9/2009 | Reddy et al. | |
| 2011/0200024 A1 | 8/2011 | Karaoguz et al. | |
| 2013/0006527 A1 | 1/2013 | Chiayee et al. | |
| 2013/0093618 A1 | 4/2013 | Oh et al. | |
| 2014/0350848 A1 | 11/2014 | Moerman | |
| 2017/0146660 A1* | 5/2017 | Xu | G01S 19/05 |
| 2018/0159935 A1* | 6/2018 | Cavalcanti | H04W 4/44 |

OTHER PUBLICATIONS

"Time to first fix", 2 pgs., retrieved from the Internet Jun. 3, 2016 at: http://en.wikipedia.org/wiki/Time_to_first_fix.
"How GPS Works", Integrated Mapping Ltd., 3 pgs., retrieved from the Internet Jun. 3, 2016at: http://www.maptoaster.com/maptoaster-topo-nz/articles/how-gps-works/how-gps-works.html (2014).
Amini, A. et al. "Improving GPS-based vehicle positioning for Intelligent Transportation Systems", IEEE Intelligent Vehicles Symposium Proceedings, pp. 1023-1029 (2014).
Extended European Search Report for Patent Appln. No. 15173973.7(Dec. 10, 2015).

* cited by examiner

*Primary Examiner* — Harry K Liu
(74) *Attorney, Agent, or Firm* — Rajeev Madnawat

(57) ABSTRACT

A method and system are provided. A first request for satellite navigation data is provided to a vehicle to everything V2X receiver. Satellite navigation data recovered from a V2X message is received from the V2X receiver. The satellite navigation data is provided to a satellite navigation system receiver. The satellite navigation data comprises the data required by the satellite navigation system receiver to perform a hot start.

14 Claims, 6 Drawing Sheets

ASSISTED GPS

CROSS-REFERENCE TO RELATED APPLICATIONS

This application claims the priority under 35 U.S.C. § 119 of European Patent application no. 15173973.7, filed on Jun. 26, 2015, the contents of which are incorporated by reference herein.

FIELD

The present application relates to positioning systems using satellite data.

BACKGROUND

Global navigation satellite systems (GNSS) exist in which information received by line of sight from multiple satellites orbiting the earth is used to determine the position of a receiver of the information. Several GNSS systems exist, each with their own satellites and transmission specifications. Examples of these systems may be, for example, the global positioning system (GPS), GLONASS, BeiDou Navigation satellite system and the European Galileo, some of which may be in the earlier stages of implementation.

Very generally, a GNSS receiver works by calculating the receiver position based on received satellite signals. Each satellite transmits an indication of its position and time of transmission. On reception, the receiver can determine the time taken for the transmitted signal to reach the receiver based on the time of transmission indicated in the signal and highly accurate timing at the receiver. This time taken can be translated into a distance from the satellite to the receiver. On reception of such signals from four or more satellites, the receiver can calculate its position in three dimensions.

In particular, the satellite signals can comprise a repeating pseudo random code that is unique to each satellite. During a tracking phase of the receiver, the pseudo random code from the satellite is correlated against an identical repeating pseudo random code at the receiver. The offset between the codes indicates the time difference between the transmission of the signal and the reception of the signal. The position of the receiver relative to the satellite may be determined from this time difference. By combining the receiver positions relative to multiple satellites, the receiver may determine its absolute position.

The receiver must first undergo an acquisition phase with the satellites in order to synchronise the pseudo random codes at the receiver to the pseudo random code at each satellite. During this acquisition phase, the receiver may also receive almanac and ephemeris data regarding the satellites.

The almanac data is an indication of the orbital course for each satellite in the GNSS system. The receiver can use this to determine which satellites should be visible to the receiver and hence which satellite signals to attempt to acquire and track. The almanac data comprises information about the status of the satellites and approximate orbital information. In a GPS system, it takes about 15 minutes to receive the almanac and the information in it is considered valid for up to 180 days.

The ephemeris data indicates the positions of the satellites at any instant for a period of time. During the tracking phase, the receiver may use this ephemeris data to identify the position of each satellite at any given time. The ephemeris data contains precise information about the orbit of that satellite. In GPS, the ephemeris may be updated every 2 hours and is usually valid for 4 hours.

Valid almanac data, ephemeris data, initial location of the receiver and an initial time at the receiver may be required by a GNSS receiver in some states in order to acquire a position. In GPS, the initial location should be accurate within 100 km and may include an initial velocity within 25 m/s accuracy. The initial time should be accurate within 20 seconds.

The time taken from start-up to being able to provide a position of a receiver may differ depending on what information is already available at the receiver, in other words the state of the receiver. This period can be called the time to first fix (TTFF) and can vary between 5 seconds to an hour depending on the initial state of the receiver. The receiver may be in three states—cold (factory) start; warm (normal) start; and a hot (standby) start.

In a cold or factory start, the receiver has none of the above data available and must acquire both the ephemeris and almanac data as well as initial position and time. In this state, the TTFF may be between 15 minutes and an hour.

In a warm or normal start, the current almanac, initial position, and time information at the receiver may all be valid. In this state, the receiver acquires the ephemeris data before a fix can be obtained. The TTFF may be 30 seconds to 2 minutes depending on satellite availability and the type of GPS receiver.

In a hot or standby start, the time, position, almanac, and ephemeris data are all available at the receiver. This may enable a rapid acquisition of satellite signals. The time required for a receiver in this state to calculate a position fix may also be termed time to subsequent fix (TTSF). If the receiver has been off for less than an hour, TTFF (or TTSF) may be in the region of 5-20 seconds.

Some navigation applications may be more efficient if the TTFF can be kept as short as possible. Embodiments of the present application aim to address such concerns.

SUMMARY OF INVENTION

According to a first aspect, there is provided a method comprising: providing a first request for satellite navigation data to a vehicle to everything (V2X) receiver; receiving satellite navigation data recovered from a V2X message from the V2X receiver; and providing the satellite navigation data to a satellite navigation system receiver, the satellite navigation data providing the data required by the satellite navigation system receiver to perform a hot start.

The satellite navigation data recovered from the V2X message may comprise at least one of ephemeris data; and almanac data. The at least one of the ephemeris data and almanac data may form the payload of the V2X message. The satellite navigation data may further comprise time data indicating a time at which a V2X transmitter transmitted the message and position data indicating a position of the V2X transmitter. The time and position data may form at least one header field of the V2X message.

The method may further comprise determining an initial time and an initial position of the satellite navigation system in dependence on a time at which a V2X transmitter transmitted the V2X message and a position of the V2X transmitter.

The first request may comprise an identity of a sender of a V2X message comprising satellite navigation information. The first request may further comprise an indication to the V2X receiver to decode V2X messages having said identity. The method may further comprise: transmitting, by the V2X transmitter, a V2X message comprising a request for satellite navigation data in response to the first request.

The method may further comprise: receiving, by the V2X receiver, the V2X message comprising the satellite navigation data. The method may further comprise: decoding the V2X message to recover the satellite navigation data. The message may be decoded in dependence on an identity of the message. The message may be decoded in dependence on determining whether the identity of the message matches an identity of a sender of satellite navigation information. The method may further comprise: determining, by the satellite navigation system receiver, that at least some of its satellite navigation information is invalid.

The method may further comprise: sending a request for valid satellite navigation information to an interface, wherein the interface sends the first request. The method may further comprise: receiving the satellite navigation data from the interface. The method may further comprise: performing, by the satellite navigation system receiver, a hot start by using the satellite navigation data provided by the interface as valid satellite navigation data. The satellite navigation system receiver may be a global positioning system (GPS) receiver. The V2X receiver system may operate in accordance with IEEE 802.11p protocol.

According to a second aspect, there is provided an apparatus comprising: a processor; and at least one memory; wherein the processor and at least one memory are configured to: provide a first request for satellite navigation data to a vehicle to everything (V2X) receiver via a first output; receive satellite navigation data recovered from a V2X message from the V2X receiver via a first input; and provide the satellite navigation data to a satellite navigation system via a second output, the satellite navigation data providing the data required by the satellite navigation system to perform a hot start.

The processor and at least one memory may be further configured to determine an initial time and an initial position of the satellite navigation system in dependence on a time at which a V2X transmitter transmitted the V2X message and a position of the V2X transmitter.

According to a third aspect, there is provided a system comprising: a vehicle to everything (V2X) receiver configured to receive and decode V2X messages; a satellite navigation system receiver configured to receive satellite signals and provide positional information in dependence on the satellite signals; and an interface arranged between the V2X receiver and satellite navigation system receiver and comprising a processor at least one memory which are configured to: provide a first request for satellite navigation data to the V2X receiver via a first output; receive satellite navigation data recovered from a V2X message from the V2X receiver via a first input; and provide the satellite navigation data to the satellite navigation system receiver via a second output, the satellite navigation data providing the data required by the satellite navigation system receiver to perform a hot start.

The interface may be further configured to determine an initial time and an initial position of the satellite navigation system in dependence on a time at which a V2X transmitter transmitted the V2X message and a position of the V2X transmitter. The V2X receiver may be further configured to transmit a V2X message comprising a request for satellite navigation data in response to the first request. The V2X receiver may be further configured to receive the V2X message comprising the satellite navigation data. The V2X receiver may be further configured to decode the V2X message to recover the satellite navigation data. The V2X receiver may be further configured to decode the message in dependence on an identity of the message.

The V2X receiver may be further configured to decode the message in dependence on determining whether the identity of the message matches an identity of a sender of satellite navigation information. The satellite navigation system receiver may be further configured to determine that at least some of its satellite navigation information is invalid.

The satellite navigation system receiver may be further configured to send a request for valid satellite navigation information to the interface, wherein the interface is configured to send the first request. The satellite navigation system receiver may be further configured to receive the satellite navigation data from the interface. The satellite navigation system receiver may be further configured to perform a hot start by using the satellite navigation data provided by the interface as valid satellite navigation data. The satellite navigation system receiver may be a global positioning system (GPS) receiver. The V2X receiver system may operates in accordance with IEEE 802.11p protocol.

According to a fourth aspect, there may be provided a vehicle comprising: a vehicle to everything (V2X) receiver configured to receive and decode V2X messages; a satellite navigation system receiver configured to receive satellite signals and provide positional information in dependence on the satellite signals; and an interface arranged between the V2X receiver and satellite navigation system receiver and comprising a processor at least one memory which are configured to: provide a first request for satellite navigation data to the V2X receiver via a first output; receive satellite navigation data recovered from a V2X message from the V2X receiver via a first input; and provide the satellite navigation data to the satellite navigation system receiver via a second output, the satellite navigation data providing the data required by the satellite navigation system receiver to perform a hot start.

BRIEF DESCRIPTION OF DRAWINGS

Embodiments will be described, by way of example only, with reference to the drawings, in which.

DESCRIPTION

Figure 1:
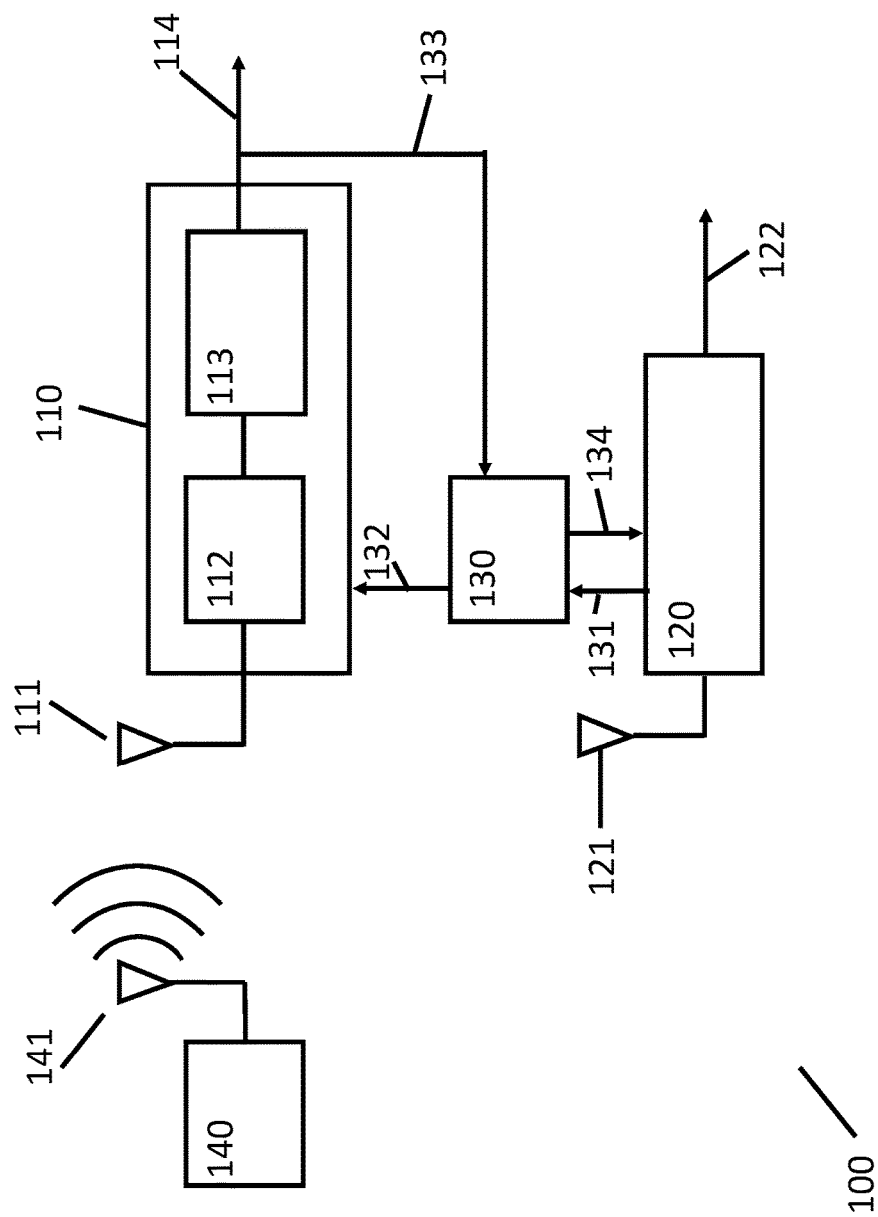
FIG. 1 is a schematic diagram showing an example of one implementation of the present disclosure.

The use of a global navigation satellite system (GNSS) such as the global positioning system (GPS) may be useful for the navigation of vehicles in a transport system, for example for the navigation of vehicles such as cars or commercial vehicles on a road system. Such vehicles are often additionally equipped with communication systems which aim to aid the safe transit of the vehicle. Examples of such communication systems may fall under the category of intelligent transport solutions.

Intelligent transportation systems have been proposed which aim to provide innovative services relating to different modes of transport and traffic management which will enable various users to be better informed and make safer, more coordinated, and 'smarter' use of transport networks. In particular, intelligent transport solutions have been proposed for use in road transportation in which information and communication technologies may be applied to, for example, infrastructure, vehicles and users as well as in traffic mobility management.

Part of such solutions involve the ability of a vehicle to communicate. For example, communication by a vehicle with other vehicles, infrastructure such as toll gates or parking meters and/or other entities may be beneficial to implementation of intelligent transport solution. In response to such communications, a vehicle may change its behaviour. For example, if the communication indicates that there is heavy traffic ahead, a vehicle may suggest that another route be taken. In the case that an obstacle is detected ahead, the vehicle may brake or implement other collision avoidance. Thus the detection of erroneous information in such communications is of interest.

The ability of a vehicle to communicate may include one or more communication inputs that allow the vehicle to receive information from other entities. One source of information is data transmitted from other vehicles in the environment. Information from other vehicles may provide additional information about the environment, for example traffic conditions. For example, a vehicle that brakes suddenly may be able to transmit this information to the vehicles following it.

An example of a communication input may be vehicle to vehicle communication (V2V), vehicle to infrastructure (V2I) and/or vehicle to everything (V2X) communication. V2I may include communication between vehicle and road side entities such as traffic lights, dynamic speed signs, toll gates or other payment collection. V2X communication may include communication between the vehicle and further entities. The V2V, V2I and V2X communications may in accordance with the IEEE 802.11p standard.

V2X communication may be provided by a dedicated, built in communication apparatus within a vehicle. Alternatively, after-market devices may be provided which may be retrospectively placed in the vehicle and optionally integrated with other systems within the vehicle to provide the V2X communication. In other or further embodiments mobile communication devices may be capable of V2X communication. These mobile communication device may for example be placed in a vehicle to carry out V2X communications on its behalf and interface with or relay this to the vehicle.

In embodiments of the present application, the V2X communication system is used to provide data required by a GNSS system to perform a hot start. The data may be received in a V2X message comprising the ephemeris and almanac information required by the GNSS system. The V2X message may further comprise an indication of a time at which the message was sent as well as an indication of the position (optionally including the velocity) of a sender of the message. The time and position information within the V2X message may be used as the initial time and position information required by a GNSS receiver in order to carry out a hot start.

As V2X messages can only be received within a certain range, for example within 1 km, the position of the receiver may be deduced to be within that range. The accuracy of the initial position for a GNSS receiver for a hot start is required to be within a 100 km range. Thus the difference in position of the sender of the V2X message and receiver of the V2X message is acceptable to the GNSS receiver. The accuracy of the initial time for the GNSS receiver is required to be within a 20 second range. The transmission time taken for a V2X message from a transmitter to receiver is less than a second and thus the time at transmission of the V2X message is acceptable to the GNSS receiver.

Embodiments may thus take advantage of the inherent information within a V2X message as well as the knowledge of a sender of the V2X message of the ephemeris and almanac information in order to provide a GNSS receiver with the required information to perform a hot start.

FIG. 1 shows an example of a system 100 in which navigation information for a GNSS system may be received via a V2X message. FIG. 1 shows a V2X transmitter 140, V2X receiver 110 and GNSS receiver 120. The V2X transmitter 140 comprises and antenna 141 over which it may transmit V2X messages. The V2X receiver 110 comprises an antenna 111, a front end 112 and a decoder 113. The V2X receiver is configured to receive and decode V2X messages.

It will be appreciated that only the receiver part of a V2X system has been depicted in FIG. 1 and the V2X system may further comprise additional entities for processing the information decoded from the V2X message. For example the V2X system may further comprise an interface for initiating safety actions such as braking, swerving, seat-belt pretensioning and/or other actions in response to the V2X information. The V2X receiver 110 of FIG. 1 further comprises an output 114 to provide the decoded V2X information to additional entities in the V2X system.

The GNSS receiver 120 may comprise and antenna 121 for receiving satellite signals. The GNSS receiver 120 may determine a position of the system 100 in dependence on the satellite signals and further comprises an output 122 for providing positional information to further entities.

The system 100 may further comprise an interface 130. The interface 130 provides and interface between the V2X receiver 110 and the GNSS receiver 120. In this sense, the interface 130 may allow the GNSS receiver 120 to use GNSS data received via the V2X receiver 110. The interface 130 comprises a first input 131 from the GNSS receiver 120 and a first output 134 to the GNSS receiver 120. The first input 131 may be configured to receive a request from the GNSS receiver for GNSS data from the V2X system. The first output 134 may provide the GNSS data from the interface to the GNSS receiver 120. The interface 130 further comprises a second input 133 from the V2X receiver 110 and a second output 132 to the V2X receiver 110. The second output 132 may provide a request to the V2X receiver 110 to decode a V2X message comprising GNSS data. The second input 133 may receive the decoded GNSS data from the V2X receiver 110.

In some examples, the interface may be an active component that may translate and/or reformat data between the GPS system and the V2X communication system. For example, in the case where these systems use different message formats, the interface may allow communication between them. In other examples, information recovered from a V2X communication message may be in a format suitable for a satellite receiver. In some of these examples the interface may transparent to the satellite receiver 120 and/or the V2X communication receiver 110.

In operation, the GNSS receiver 120 may be started up in a cold (factory) or warm (normal) start. This may occur when the GNSS receiver 120 has been off for a certain period of time. In a cold start, the GNSS receiver 120 may not have valid ephemeris, almanac, initial time and position data. In a warm start, the GNSS receiver may have valid almanac, time and position data but not have valid ephemeris data.

In one example, the GNSS receiver 120 may make a request to determine whether GNSS data is available from the V2X communication receiver 110. If such GNSS data is not available from the receiver, the GNSS receiver 120 may receive via the conventional satellite signals. If the GNSS receiver requests the GNSS data, the GNSS receiver 120 may send a request to the interface 130 via the first input 131 querying whether any GNSS data is available. The interface 130 may send a request via its second output 132 to the V2X receiver 110. In some examples, the interface 130 may reformat the request from the GNSS system 120 into a format for the V2X receiver 110.

In some examples the request may specify the type of GNSS data. For example, if the GNSS receiver 120 is in a warm start, the request may be for the ephemeris data only, whereas in a cold start, the request may be made for both ephemeris and almanac data. It will be appreciated that in some embodiments, the time and position data may arrive as a by-product of receiving the V2X message and may not be explicitly requested.

In response to the request over the second output 132, the V2X receiver 110 may decode a V2X message comprising GNSS data. In some examples, the request from the interface 130 may cause the V2X receiver 110 to transmit a V2X message to other V2X entities requesting GNSS data. In other examples, V2X messages comprising GNSS data may be transmitted from other entities periodically or continuously. In either case, a request from the interface 130 may cause the V2X receiver 110 to decode a V2X message comprising GNSS data.

The V2X transmitter 140 may transmit a V2X message comprising GNSS data. The GNSS data may comprise ephemeris and/or almanac data as its payload. In some examples the type of GNSS data in the V2X message may be dependent on a request sent by the V2X receiver 110 (if any). The message may additionally comprise a time of transmission, for example in the form of a time-stamp, and a position of the V2X transmitter 140. The V2X message may further comprise an identity of the message. This may for example be an identity of a sender (the V2X transmitter 140) of the message and/or an identity indicating that the message comprises GNSS data. It will be appreciated that the system 100 may comprise a plurality of V2X transmitters 140 transmitting GNSS data and that the identity broadcast by each of these may be the same. In other words, the identity may indicate that a message comprises GNSS data rather than the uniquely identifying a specific transmitter of the message.

It will be appreciated that the GNSS data that is transmitted may have been acquired by the V2X transmitter through several possible means. In one example, the V2X transmitter 140 may further comprise a GNSS receiver (not shown). In this case the V2X transmitter 140 may have received the ephemeris and almanac data from satellite signals being transmitted within the GNSS system. The GNSS receiver of the V2X transmitter 140 may continuously update the ephemeris and almanac information at the V2X transmitter 140 so that the GNSS data is valid. In other or additional examples, the V2X transmitter 140 may have received the GNSS data from a further entity. For example, the V2X transmitter 140 may further comprise links to a mobile network and/or the internet and have initially downloaded the GNSS data through those means. It will also be appreciated that the V2X transmitter 140 may be implemented in various forms. In one example, the V2X transmitter 140 may be a dedicated GNSS data transmitter and may for example, be fixed in a stationary position and preferable a position with a good range to potential V2X receivers and (optionally in the case where the GNSS data is acquired directly from the satellite signals) satellites. For example, the V2X transmitter 140 may be implemented as a fixed position on top of a building or other suitable point. In this case, the V2X transmitter 140 may continuously or periodically transmit the V2X message comprising the GNSS data.

In other examples, the V2X transmitter 140 may be a V2X transmitter of a neighbouring vehicle or entity having a V2X system and GNSS system in accordance with embodiments. In this case, the entity may be configured to periodically transmit the V2X message comprising its current GNSS information and/or transmit this message in response to a V2X message being received and requesting the GNSS data. The use of another vehicle or entities V2X receiver may reduce the infrastructure required to implement some embodiments.

The V2X message comprising the GNSS data may be received at the V2X receiver 110. In some examples, the V2X message is received at the antenna 111 and passed to the front-end 112 for down-converting and initial processing. The V2X receiver 110 may identify that a received V2X message comprises GNSS data based on an identity of the message. The identity of the message may be included within the message and may identify a sender of the message. It will be appreciated that in some embodiments V2X messages comprising GNSS data may have their identity set to the same value.

The message is then passed to the decoder 113 which may decode and recover the GNSS data received in the message. The V2X receiver 110 may decode the message and recover the GNSS data. The GNSS data may comprise the ephemeris and almanac data as well as the time at which the message was transmitted and the position of the transmitter 140. The GNSS data is then provided from the V2X receiver 110 to the interface 130 via the second input 133.

The interface 130 may receive the GNSS data and optionally reformat it to provide it to the GNSS receiver 120 via the first output 134. The interface 130 may set a time at the GNSS receiver field to the time at the transmitter received from the V2X transmitter 110. The interface 130 may further set a position of the GNSS receiver field to the position of the transmitter 140 received from the V2X receiver 110. It will be appreciated that the difference in position between the V2X transmitter 140 and the GNSS receiver 120 is within an allowed accuracy range for the initial position for the GNSS receiver 120. It will also be appreciated that the time error due to the transmission time taken for the V2X message may be within an allowed accuracy range for the GNSS receiver 120.

The GNSS receiver 120 may receive the ephemeris and/or almanac, initial time and initial position information from the V2X receiver via the interface 130. The GNSS receiver 120 may then perform a hot start based on this information. The GNSS receiver 120 may further receive satellite signals via the antenna 121 and may determine and track its position based on GNSS data received over the output 134 and the received satellite data. The GNSS receiver 120 may provide positional information on the GNSS output 122.

The foregoing has described the GNSS receiver 120 requesting to receive GNSS data. In some examples, this request may be omitted. In some examples, the V2X receiver 110 may be configured to decode all messages having a message identity that is indicative of GNSS data. These decoded message may be provided directly to the interface 130 on reception and then further provided to the GNSS receiver 120. In this case, the V2X receiver 110 may have been configured by the interface 130 to decode received messages have a message identity that corresponds to GNSS data. The V2X receiver may be later configured to ignore such messages, for example once a GNSS position fix has been acquired. For example, the V2X receiver 110 may be configured to decode V2X messages comprising GNSS data while the GNSS receiver 120 is in a start-up mode or during its time to first fix (TTFF).

Figure 2:
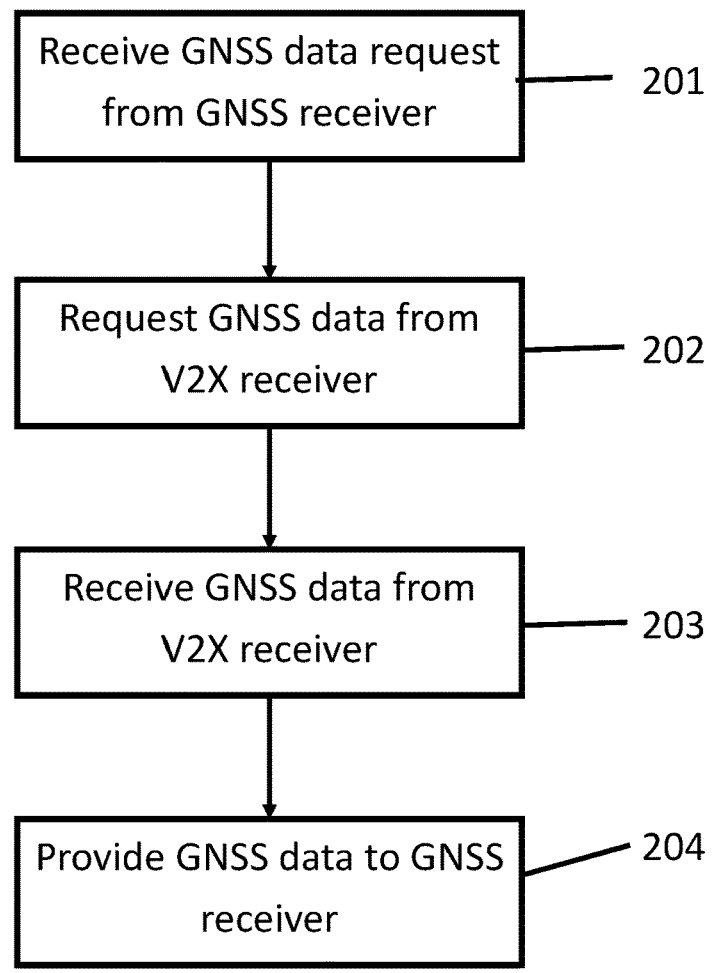
FIG. 2 is a flow diagram depicting method steps carried out by an interface in one example.

FIG. 2 is a method diagram showing the method steps carried out by the interface 130 in some examples. At step 201 of FIG. 2, the interface 130 receives a request for GNSS data from the GNSS receiver 120. The request may be received over the first input 131. In some examples the request may be an explicit request, in others the request may be an indication that the GNSS receiver 120 is in start-up (or in a TTFF period) and optionally a type of start-up mode (for example warm or cold).

The interface 130 may provide a request for GNSS data to the V2X receiver 110 at step 202. In some examples, the interface 130 may reformat the request received at step 201 to be compatible with the V2X receiver 110 and/or include an identity of a sender of GNSS data in the request. The request may be a request for the V2X receiver 110 to decode messages with that identity. The request may further include an indication of what kind of data, for example almanac and/or ephemeris data, is being requested.

At step 203, the interface 130 may receive GNSS data from the V2X receiver 110. The GNSS data may have been decoded from a V2X message received at the V2X receiver 110. The GNSS data from the V2X receiver 100 may, in some examples, comprise ephemeris data, almanac data, a time that the V2X message was transmitted and a position of the V2X transmitter 140 of the message. In some examples, the interface 130 may reformat the GNSS data for the GNSS receiver 120. The interface 130 may provide a message comprising the almanac and/or ephemeris data to the GNSS receiver 120. The interface 130 may set a GNSS receiver time field in the message to be equal to the time at which the V2X message was transmitted. The interface 130 may set a GNSS receiver position field of the message to be equal to the position of the V2X transmitter 140. At step 204, the interface 130 may provide the message comprising the GNSS data to the GNSS receiver 120.

Figure 3:
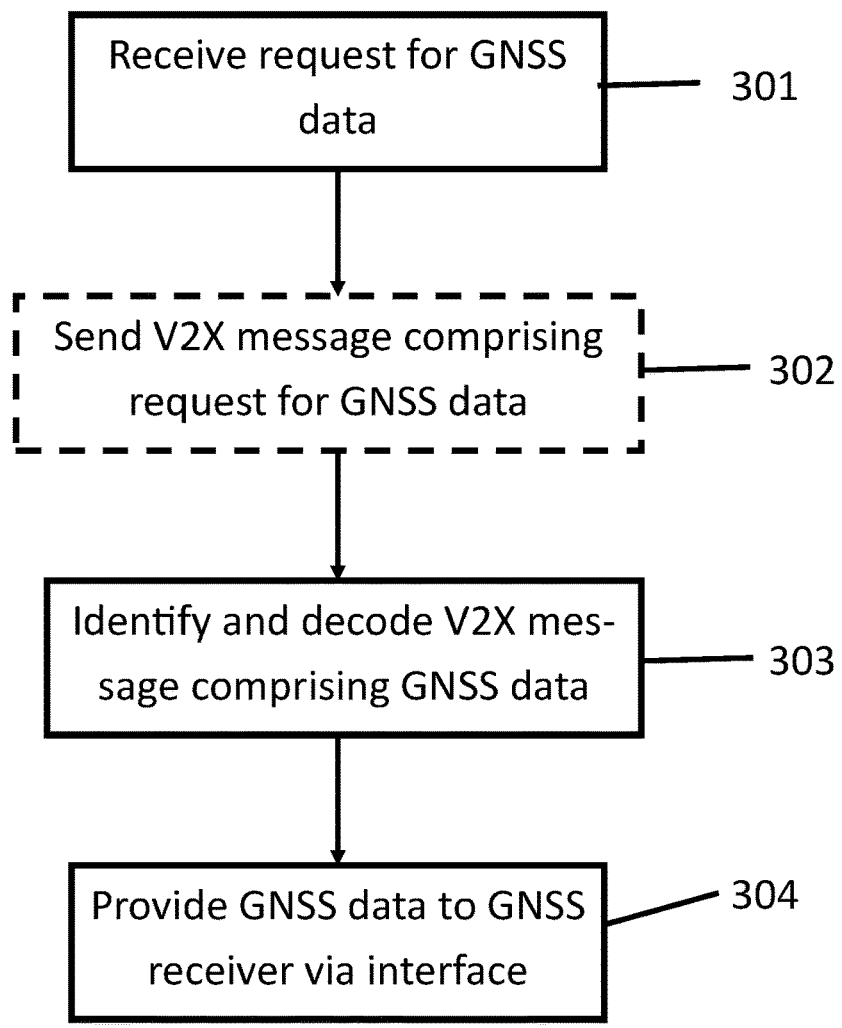
FIG. 3 is a flow diagram depicting method steps carried out by a V2X receiver in one example.

FIG. 3 shows an example of the method steps that may be carried out by the V2X receiver 110. At step 301, the V2X receiver 110 receives a request for GNSS data. This request may be received from the GNSS receiver 120 via the interface 130. In one example, the request at step 301 may include an identity of a sender of a V2X message comprising GNSS data. At step 302, the V2X receiver and/or V2X system may optionally transmit a V2X message to one or more neighbouring V2X entities, requesting that they send a V2X message comprising the GNSS data to the V2X receiver 110. It will be appreciated that step 302 is optional. In some examples, a V2X entity in the vicinity of the V2X receiver 110 may periodically or continuously transmit GNSS data.

The V2X receiver may receive one or more V2X messages comprising GNSS data. The receiver may identify a message comprising the GNSS data and decode it at step 303. The V2X receiver 110 may identify the message by, for example, an identity of the message indicating that the message comprises GNSS data. This identity may correspond to an identity of a sender of GNSS data. In some examples, the identity may have been provided to the V2X receiver 110 by the interface 130.

The V2X receiver 110 may decode the V2X message to recover the GNSS data. In one example, the V2X receiver 110 may recover GNSS data comprising ephemeris and/or almanac information and a time at which the V2X message was transmitted and a position from which the V2X message was transmitted. At step 304, the V2X receiver 110 may provide this data to the GNSS receiver 120 via the interface 130.

Figure 4:
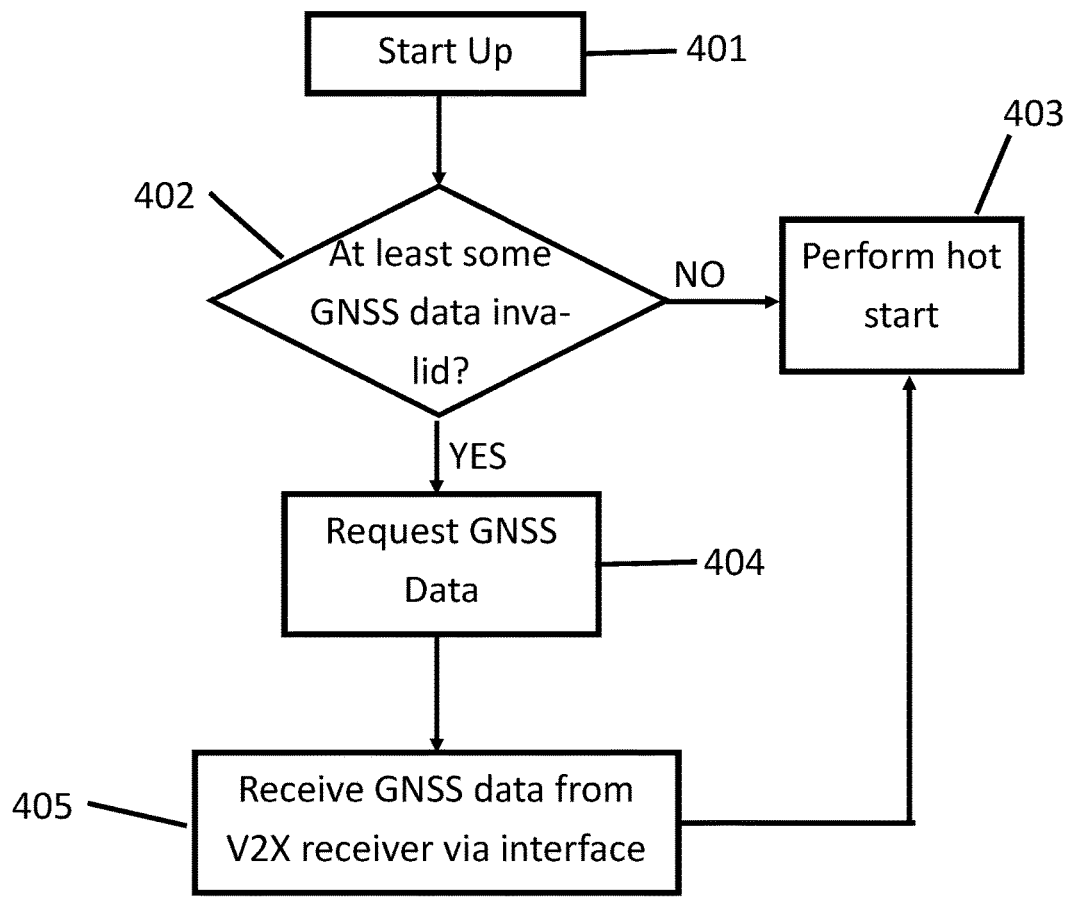
FIG. 4 is a flow diagram depicting method steps carried out by a GNSS receiver in one example.

FIG. 4 is a method diagram showing an example of the method steps that may be carried out by a GNSS receiver 120. At step 401, the GNSS may be started up. At step 402, the GNSS receiver 120 may determine whether any or all of its current GNSS data is invalid. In some examples, the GNSS receiver 120 may have been off for a period of time in which its previous GNSS data became invalid. The GNSS receiver 110 may determine whether at least one of the ephemeris and almanac data is invalid. If the GNSS data at the GNSS receiver 110 is all valid, the method may proceed to step 403, where the GNSS receiver 110 performs a hot start.

If at least one of the ephemeris and almanac information is invalid, the method proceeds to step 404 where the GNSS receiver 110 may request any available GNSS data from the interface 130. At step 405, in response to the request at step 404, the GNS receiver 120 may receive GNSS data from the V2X receiver 110 via the interface 130. The method may then proceed to step 403 where the GNS receiver 120 may perform a hot start using the GNSS data received at step 405.

Figure 5:
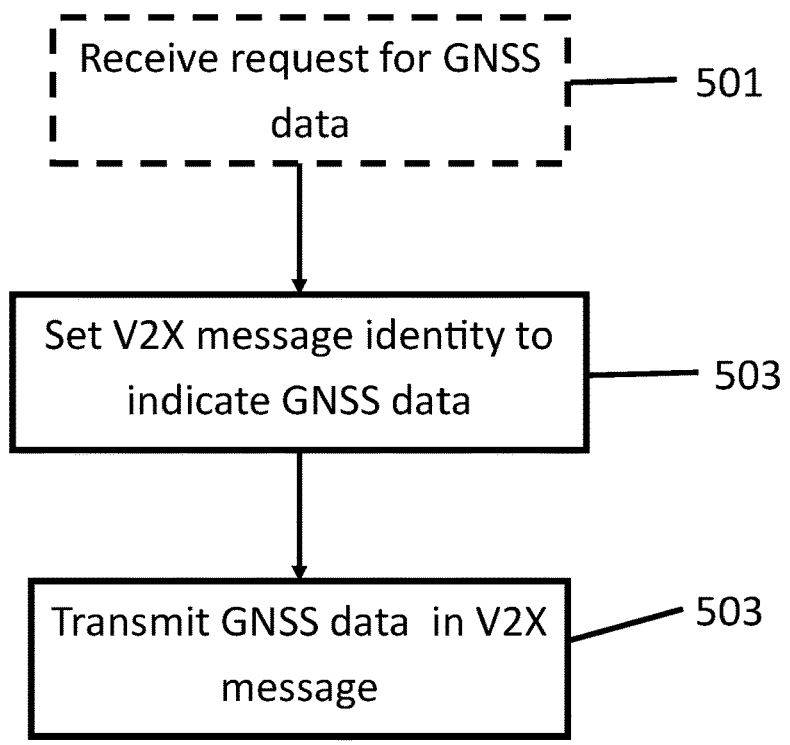
FIG. 5 is a flow diagram depicting method steps carried out by a V2X transmitter in one example.

FIG. 5 is a method diagram showing the method steps that may carried out by a V2X transmitter 140 in some examples. At step 501, the V2X transmitter 140 may optionally receive a request for GNSS data from the V2X receiver 110. It will be appreciated that this step is optional. In other examples, the V2X transmitter 140 may be configured to continuously or periodically transmit the GNSS data. In some examples, the V2X transmitter 140 may be a dedicated transmitter for GNSS data. In other examples, the V2X transmitter 140 may be part of a working V2X system for a vehicle or roadside entity.

At step 502, the V2X transmitter may set the identity of a V2X message comprising the GNSS data to an identity identifying that the message comprises V2X data. In an example where the V2X transmitter 140 is a dedicated GNSS data transmitted, the identity of all the messages transmitted from that transmitter 140 will correspond to the identity of a sender of GNSS data. In the example where the V2X transmitter is a neighbouring entity that may transmit other V2X information, the identity will be set only for messages comprising GNSS data. At step 503, the V2X transmitter 140 transmits the V2X message comprising the GNSS data.

The foregoing has described the V2X receiver 110 decoding at least one V2X message comprising the GNSS data. In some examples, the GNSS data may be carried by a single V2X message, however in other examples, the GNSS data may be split into two or more V2X messages. These messages may be received from separate entities, for example on the case that there is more than one V2X transmitter 140 in the vicinity of the V2X receiver 110. In an example of a current GPS system, the ephemeris and almanac data may be approximately 2 kilobytes in size. An example of a V2X (802.11p) message (at MAC layer) may be for example a maximum of 2362 bytes long, including all headers. It may be possible to encapsulate the complete almanac and ephemeris in a single 802.11p data frame. In some cases, it may be fragmented over two or more 802.11p frames.

In some examples, the format of the V2X message carrying the GNSS data may be similar to the format of other V2X messages and may comprise the standard headers with the GNSS data being the payload. The message headers in this case may include a time-stamp indicating the time at which the message was sent as well as an indication of a position of the sender. The message headers may further include a message identity or identity of a sender of the message. It will however be appreciated that this is by way of example only and in other examples the messages may have a format specific to V2X messages carrying GNSS data.

Figure 6:
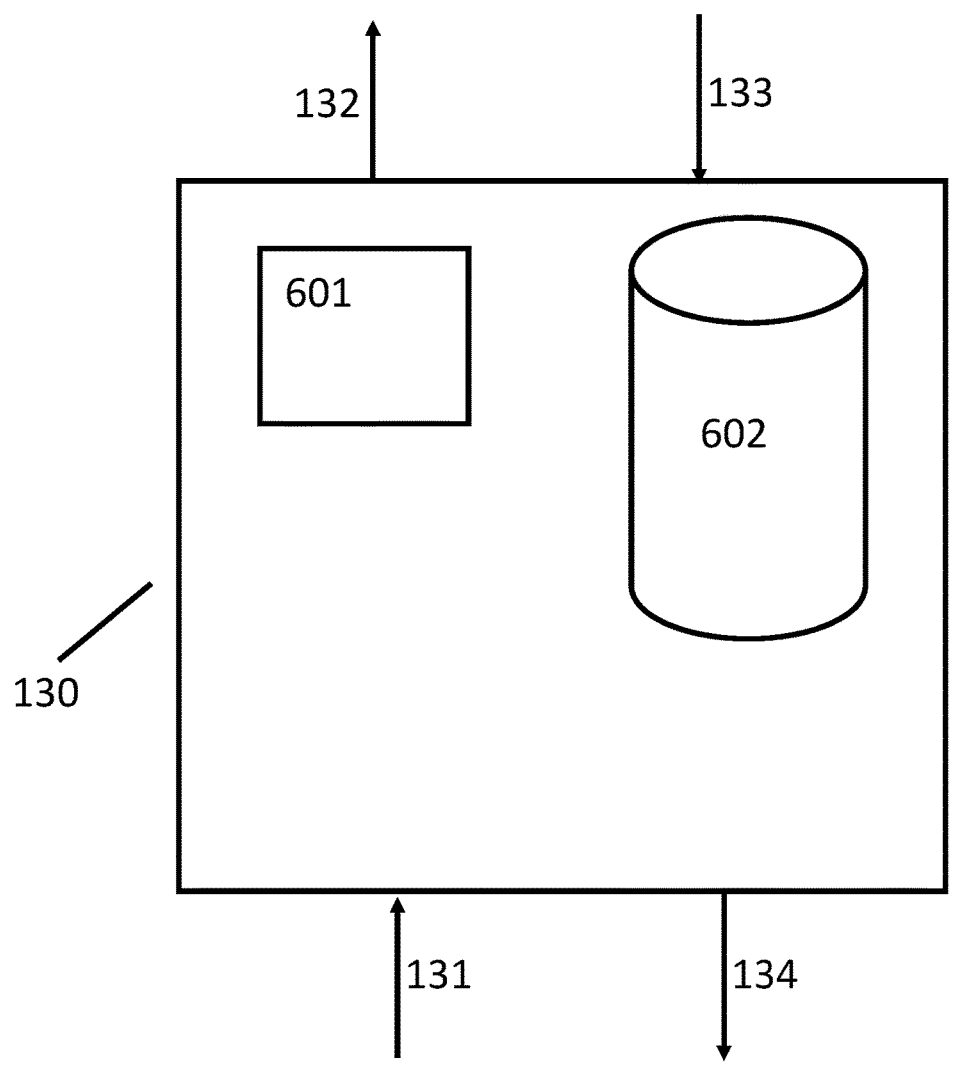
FIG. 6 is a schematic diagram showing an apparatus according to an example.

FIG. 6 is a schematic diagram showing one example of an apparatus that may implement the interface 130. The apparatus 130 comprises a processor 601 and at least one memory 602. The apparatus may have a first input 131 and a first output 134 for communicating with the GNSS receiver 120. The apparatus 130 may further comprise a second input 133 and a second output 132 for communicating with the V2X receiver 110.

The interface has been depicted as being a standalone block 130 that is separate from the V2X receiver 110 and the GNSS receiver 120. It will however be appreciated that the interface 130 may be integrated into the V2X receiver 110 and/or the GNSS receiver 120 in some examples. In some examples, the interface 130 may form part of a V2X receiver system and may provide an interface to receive and handle requests from a GNSS system. In other examples, the interface 130 may form part of a GNSS system and provide an interface to send requests to a V2X system and receive responses therefrom.

It will be appreciated that the memory 602 and processor 601 of the interface 130 may not be exclusive for use in the interface 130 and may be used in conjunction with other algorithms being implemented in a system. It will also be appreciated that the interface 130 and/or one or more of the GNSS and V2X systems may be integrated within a vehicle or may be a standalone device that may communicate with one or more integrated systems.

In the foregoing we have referred to the system forming part of a vehicle. It will be appreciated that a vehicle may be any mobile entity such as a car, transport truck, train, motorcycle and/or other transport entity for example a boat, train, aeroplane or automated vehicle. Furthermore, it will be appreciated that embodiments are not restricted to the use of vehicles only and may apply to any entity incorporating a GNSS and V2X system directly or indirectly.

The invention claimed is:

1. A method comprising:
providing, from a processor in an interface, a first request for satellite navigation data to a vehicle to everything (V2X) receiver;
receiving, in the processor, decoded satellite navigation data recovered from a V2X message received by the V2X receiver from a V2X transmitter; and
providing the decoded satellite navigation data from the interface, to a satellite navigation system receiver, the decoded satellite navigation data providing the almanac, ephemeris, position, and time data required by the satellite navigation system receiver to perform a hot start.

2. The method of claim 1, wherein both the ephemeris data and the almanac data form a payload of the V2X message.

3. The method of claim 1, wherein the time data indicates a time at which the V2X transmitter transmitted the V2X message to the V2X receiver and position data indicates a position of the V2X transmitter.

4. The method of claim 3, wherein the time data and the position data form at least one header field of the V2X message.

5. The method of claim 1, wherein the first request comprises an identity of a sender of a V2X message comprising satellite navigation information and an indication to the V2X receiver to decode V2X messages having said identity.

6. The method of claim 1, further comprising:
receiving, by the V2X receiver, the V2X message comprising the satellite navigation data.

7. The method of claim 6, wherein the message is decoded in dependence on an identity of the message.

8. The method of claim 1, further comprising:
determining, by the satellite navigation system receiver, that at least some of its satellite navigation information is invalid; and
sending a request for valid satellite navigation information to the interface.

9. The method of claim 8, further comprising:
receiving the satellite navigation data from the interface; and
performing, by the satellite navigation system receiver, the hot start by using the satellite navigation data provided by the interface as the valid satellite navigation data.

10. The method of claim 1, wherein the satellite navigation system receiver is a global positioning system (GPS) receiver.

11. The method of claim 1, wherein the V2X receiver system operates in accordance with IEEE 802.11p protocol.

12. The method of claim 11, wherein the almanac data and the ephemeris data are encapsulated within a single 802.11p data frame.

13. An interface apparatus comprising:
a processor; and
at least one memory, wherein the processor and at least one memory are configured to provide, from the processor, a first request for satellite navigation data to a vehicle to everything (V2X) receiver via a first output, receive, in the processor, decoded satellite navigation data recovered from a V2X message, received by the V2X receiver from a V2X transmitter, via a first input, and provide the decoded satellite navigation data to a satellite navigation system via a second output, the satellite navigation data providing the almanac, ephemeris, position, and time data required by the satellite navigation system to perform a hot start.

14. A system comprising:
a vehicle to everything (V2X) receiver configured to receive and decode V2X messages;
a satellite navigation system receiver configured to receive satellite signals and provide positional information in dependence on the satellite signals; and
an interface, arranged between the V2X receiver and satellite navigation system receiver, comprising a processor and at least one memory which are configured to provide, from the processor, a first request for satellite navigation data to the V2X receiver via a first output, receive, in the processor, decoded satellite navigation data recovered from a V2X message, received by the V2X receiver from a V2X transmitter, via a first input, and provide the decoded satellite navigation data to the satellite navigation system receiver via a second output, the satellite navigation data providing the almanac, ephemeris, position, and time data required by the satellite navigation system receiver to perform a hot start.

* * * * *